(No Model.)
H. A. HOGEL.
PROCESS OF MANUFACTURING SALT FROM BRINE.
No. 371,503. Patented Oct. 11, 1887.
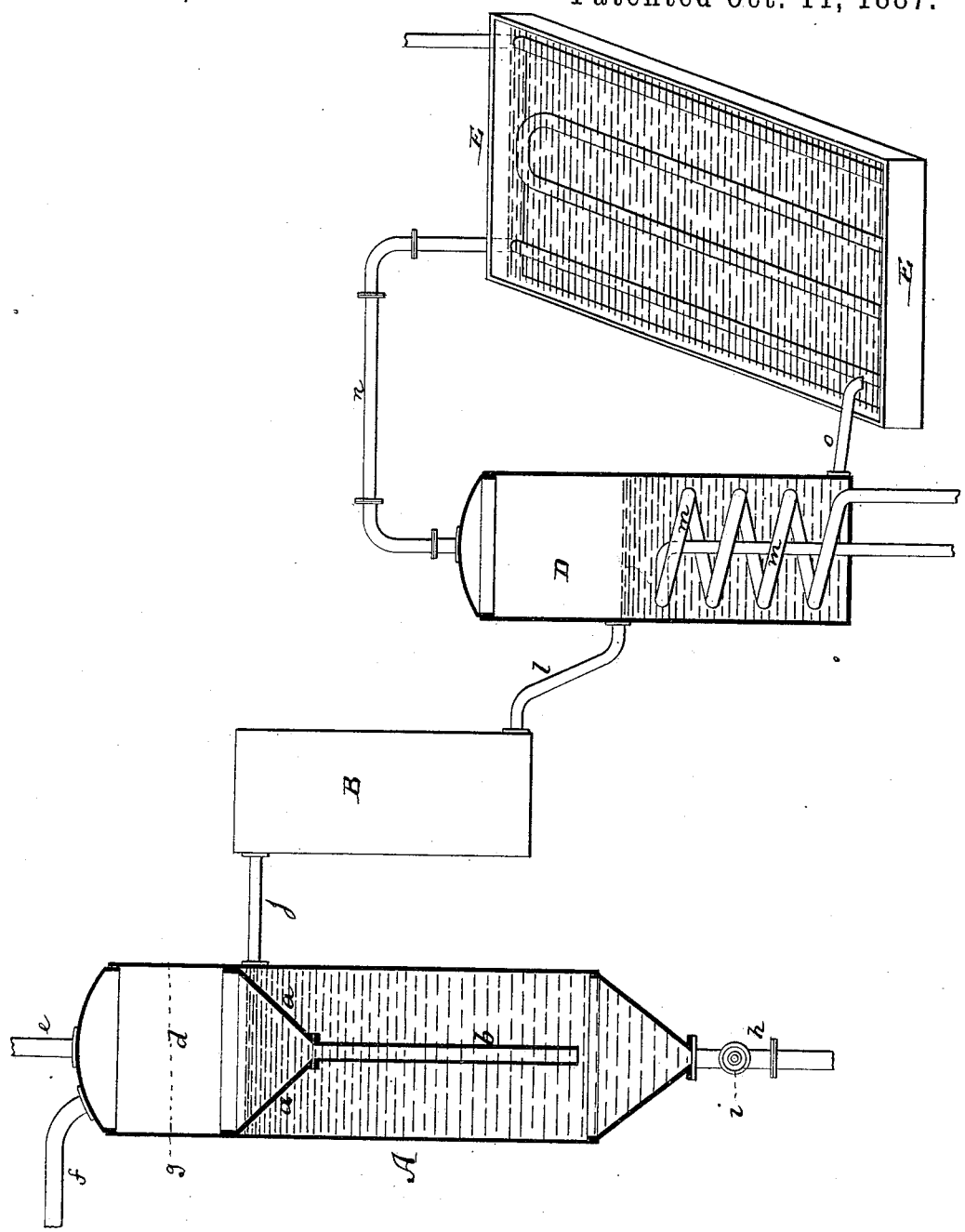
WITNESSES:
A. Schehl.
Harry M. [illegible]
INVENTOR
Hascal A. Hogel
BY Briesen & Steele
ATTORNEYS.

UNITED STATES PATENT OFFICE.

HASCAL A. HOGEL, OF YONKERS, NEW YORK.

PROCESS OF MANUFACTURING SALT FROM BRINE.

SPECIFICATION forming part of Letters Patent No. 371,503, dated October 11, 1887.

Application filed July 8, 1886. Serial No. 207,402. (No model.)

*To all whom it may concern:*

Be it known that I, HASCAL ALFRED HOGEL, a resident of Yonkers, in the county of Westchester and State of New York, have invented an Improved Process of Manufacturing Salt from Brine, of which the following is a full, clear, and exact description, reference being made to the accompanying drawing, which represents a sectional side view of the apparatus used by me in carrying my process into effect.

The object of this invention is to convert brine into salt by a rapid process, and with the assistance of steam, without clogging the pipes and conduits used with sulphate of lime or other impurities that are dissolved in the brine. The processes and apparatus heretofore used for the same purpose were frequently objectionable, because of the clogging of pipes and conduits and their outlets by the sulphate of lime.

My process consists, as to the main feature of novelty, mainly, in exposing the brine provisionally to the direct action of steam under great pressure, thereby boiling the brine and producing a partial precipitation of the sulphate of lime, all as hereinafter described.

Referring first to the drawing, the letter A represents the receiving-vessel for the brine, which vessel has a false bottom at $a$ and a pipe projecting downwardly from said false bottom at $b$. The brine to be treated is conducted into the upper chamber, $d$, of the receiving-vessel A by a pipe, $e$. The steam, at a pressure of about one hundred and fifty pounds, is conducted into the same chamber $d$ by a pipe, $f$. The line $g$ in the drawing indicates the height at which the brine is intended to stand in the vessel A. The lower part of this vessel A has an outlet at $h$, which can be closed by a suitable gate or cock, $i$.

From the side of the vessel A, beneath the false bottom $a$, extends a pipe, $j$, into a filter, B. From this filter B a pipe, $l$, leads into a vessel, D, which I term the "saturator." This saturator contains a coil, $m$, of steam-pipe, and has its neck contracted and connected with a pipe, $n$, that leads into the pan E, termed the "grainer," and traverses the bottom of said pan in form of a coil, as shown. From the lower part of the saturator D a pipe, $o$, extends into the tank E. This being the apparatus I employ, its use will be readily understood from the subsequent description.

The brine being conducted into the chamber $d$ of the receiving-vessel A by the pipe $e$, together with steam, which reaches the same chamber through the pipe $f$ at a high pressure, as stated, the result will be that the brine is rapidly boiled under pressure within the vessel A, and in this condition precipitates a large proportion of the sulphate of lime or other impurities which it contains. These impurities settle in the preferably-contracted lower part of the vessel A, and may from time to time be blown out by opening the gate or valve $i$. From the vessel A the brine, treated as aforesaid, passes through the pipe $j$ into the filter B, in which the brine is filtered, so as to part with the remaining sulphate of lime or other impurities. From this filter the brine passes, at a salinometer strength of about 68°, (more or less,) through the pipe $l$, into the saturator D, within which the brine is exposed to the action of heat that passes through the coil $n$. This heat causes sufficient of the water of the brine to evaporate to bring the brine up to the point of saturation—that is, about 100° salinometer. The water which is evaporated from the saturator in the form of steam passes into the coil $n$, and serves to heat the contents of the tank or grainer E, these contents being the brine that flows from the saturator by the pipe $o$ into the tank E. Within this tank E the water is finally evaporated and the crystallized salt produced.

It will be perceived that by bringing the steam, together with the brine, into the receiving-vessel A, I obtain a very rapid boiling of the brine and such a precipitation of the impurities as will effectually prevent the clogging of pipes or conduits by these impurities.

I do not desire it to be understood that the saturator is essential to my process, as it may be dispensed with in all cases where the brine leaves the filter at the strength approaching 100° salinometer.

I do not claim exposing brine to a jet of steam, as this is shown in Patent No. 337,900.

What I claim is—

The process of treating brine, which consists in boiling the brine by conducting it into a vessel in the presence of and in direct contact with steam under pressure, and maintaining a high pressure within the vessel during the boiling operation, whereby a portion of the impurities are precipitated and forced to the bottom of said vessel, substantially as and for the purpose set forth.

HASCAL A. HOGEL.

Witnesses:
WILLIAM T. GRAFF,
HARRY M. TURK.